(12) United States Patent
Shin et al.

(10) Patent No.: US 6,299,417 B1
(45) Date of Patent: Oct. 9, 2001

(54) BACK PRESSURE STRUCTURE OF INTERMEDIATE PRESSURE OF SCROLL COMPRESSOR

(75) Inventors: Dong Ku Shin, Anyang; Young Il Chang, Seoul, both of (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/484,175

(22) Filed: Jan. 18, 2000

(30) Foreign Application Priority Data

Oct. 4, 1999 (KR) .................................................. 99-42633

(51) Int. Cl.$^7$ ............................ F04B 39/00; F04B 23/00; F16K 15/00
(52) U.S. Cl. .......................... 417/439; 137/540; 417/440
(58) Field of Search .................................. 417/439, 310, 417/440; 137/540, 543.21

(56) References Cited

U.S. PATENT DOCUMENTS

| | | | |
|---|---|---|---|
| 4,596,520 | * 6/1986 | Arata et al. | 418/55 |
| 4,846,633 | * 7/1989 | Susuki et al. | 417/310 |
| 5,173,021 | * 12/1992 | Grainger et al. | 415/119 |
| 5,848,605 | * 12/1998 | Bailey et al. | 137/540 |
| 6,089,262 | * 7/2000 | Hart | 137/543.21 |

* cited by examiner

Primary Examiner—Charles C. Freay
Assistant Examiner—Michael K. Gray
(74) Attorney, Agent, or Firm—Fleshner & Kim, LLP

(57) ABSTRACT

A back pressure structure of a scroll compressor having a fixed scroll forming a plurality of compressive chambers together with an orbiting scroll in its casing; including: a suction pressure space having a predetermined volume formed at one side of the fixed scroll; a suction hole formed for guiding a part of an intermediate gas filled in an intermediate pressure space filled in the rear side of the orbiting scroll to the suction pressure space by passing through the fixed scroll; a vent hole formed at the other side of the suction pressure space for guiding the intermediate pressure gas flown into the suction pressure space through the suction hole to the outermost compressive chamber which has a relatively low pressure; and a back pressure control valve elastically supported by an elastic member in the suction pressure space to open and close the suction hole, and receiving almost the same pressure no matter that it is opened or closed, according to which an intermediate pressure space between a main frame and an orbiting scroll is maintained in a constant intermediate pressure state to thereby prevent an abnormal movement of the orbiting scroll, so that leakage of a compressed gas is prevented, and a position of a suction hole on a fixed scroll is freely selected to be formed, thereby facilitating its fabrication.

20 Claims, 5 Drawing Sheets

BACK PRESSURE STRUCTURE OF INTERMEDIATE PRESSURE OF SCROLL COMPRESSOR

BACKGROUND OF THE INVENTION

1. Field of the Invention

The present invention relates to a scroll compressor, and more particularly, to a back pressure structure of an intermediate pressure of a scroll compressor in which an intermediate pressure space between a main frame and a orbiting scroll is maintained in a constant intermediate pressure state to thereby prevent an abnormal movement of the orbiting scroll, so that leakage of a compressed gas is prevented, and a position of a suction hole on a fixed scroll is freely selected to be formed, thereby facilitating its fabrication.

2. Description of the Background Art

In general, there are three types of compressors, that is, a reciprocating type, a scroll type and a centrifugal type (widely called a turbo type). The scroll type compressor sucks and compresses gas and discharges it by using a rotor like the centrifugal type or a sliding vane type.

The scroll compressor is classified by a low pressure type scroll compressor and a high pressure type scroll compressor depending on the fact that a suction gas is charged inside a casing or a discharge gas is charged therein.

The high pressure type scroll compressor uses a back pressure method of an intermediate pressure in which the gas permeated between the orbiting scroll and the main frame out of a high pressure discharge gas is partially orbited toward a suction chamber so that an intermediate pressure is maintained between the orbiting scroll and the main frame.

FIG. 1 is a vertical-sectional view of a horizontal type scroll compressor of a high pressure type scroll compressor in accordance with a conventional art.

As shown in the drawing, the conventional horizontal type scroll compressor is constructed in that a main frame 2 and a sub-frame 3 are respectively fixed at both sides of a horizontal casing 1 filled with oil at a predetermined height, a drive motor 4 having a stator 4A and a rotor 4B is mounted between the main frame 2 and the sub-frame 3, and a driving shaft 5 is press-fitted by passing through the main frame 2 at the center of the rotor 4B of the drive motor.

A wrap 6a is formed in an involute curve on the upper surface of the main frame 2 so that the orbiting scroll 6 combined eccentrically to the driving shaft 5 is rotatably installed. On the upper surface of the orbiting scroll 6, a fixed scroll 7, where a wrap 7a is formed in an involute curve so as to form a plurality of compressive chambers by being engaged with the wrap 6a of the orbiting scroll 6, is fixedly installed at the main frame 2.

At one side of a plate at margin of the fixed scroll 7 contacted when the orbiting scroll 7 is orbited, a suction pressure space 7c in which a flat plate-type back pressure control valve 8 elastically supported by a coil spring 9 is installed is formed.

A suction hole 7d that is opened and closed when the orbiting scroll 8 is orbited is formed at the side close to the compressive chamber of the suction pressure space 7c of the fixed scroll 7.

At the side of the suction pressure space 7c toward the compressive chamber, there are formed a vent hole 7e for guiding the intermediate pressure gas flown into the suction pressure space 7c through the suction hole 7d to the outermost compressive chamber among the compressive chambers.

Reference numeral 5a denotes a oil passage, 7f denotes a leak resistance stopper, 11 denotes a discharge pipe, 10 denotes a suction pipe, and MS denotes an intermediate pressure space.

The operation of the scroll compressor constructed as described above according to the conventional art will now be explained.

When a power is supplied, the rotor 4B is rotated along with the driving shaft 5 in side the stator 4A by the power, rendering orbiting scroll 6 eccentrically rotated as long as the eccentric distance, and as the orbiting scroll 6 is orbited at a distance as long as the revolving diameter centering around the driving shaft 5, a plurality of compressive chambers are formed between the wraps 6a and 7a of the orbiting scroll 6 and the fixed scroll 7.

As the orbiting scroll 6 is continuously orbited and moved toward the center, the volume of the compressive chambers is reduced, according to which a coolant gas flown therein through the suction pipe 10 is compressed and discharged to the inside of the casing 1 through the discharge port 7b of the fixed scroll 7 in the final compressive chamber.

The discharge gas of high pressure discharged to the inside of the casing 1 flows toward the sub-frame 3 through a coolant passing hole (not shown) formed in the main frame, and thus, the entire casing 1 is highly pressurized, of which a partial gas flows into the intermediate pressure space MS formed between the main frame 2 and the orbiting scroll 6 through a void between the driving shaft 5 and the main frame 2.

The highly pressurized discharge gas flown into the intermediate pressure space MS thrusts the main frame 2 and the orbiting scroll 6 in the opposite directions to each other, resulting in that the orbiting scroll 6 and the fixed scroll 7 are excessively adhered, which causes an increase of a friction loss.

However, in this respect, in case that the pressure of the intermediate pressure space MS goes beyond a set value of a spring elasticity value determined by a spring elasticity determined by the coil spring 9, when the orbiting scroll is rotatably moved, the intermediate pressure gas pushes upward the back pressure control valve 8 and flows to the suction pressure space 7c through the opened suction hole 7d.

The intermediate gas flown to the intermediate pressure space 7c flows to the first compressive chamber through the vent hole 7e to thereby maintain the pressure of the intermediate pressure space MS at an adequate level, thereby preventing an excessive friction loss for the orbiting scroll 6 and the fixed scroll 7.

Thereafter, when the suction hole 7d is closed according as the orbiting scroll 6 is continuously orbited, the back pressure control valve 8 is lowered down by the coil spring 9, thereby blocking the suction hole 7d.

However, as to the back pressure structure of the intermediate pressure of the conventional scroll compressor, since the bottom plane of the back pressure control valve 8 is flatly formed so as to be contacted with the plane where the suction hole 7d of the suction pressure space 7c is formed, the areas pressurized by the discharge gas flown into the suction hole 7d are different to each other according to the opening and closing state of the valve 8.

Thus, a reactivity of the back pressure control valve 8 is delayed, so that the variation of the intermediate pressure is deepened, and thus, the movement of the orbiting scroll 6 becomes unstable, degrading the efficiency of the compressor.

In addition, there is a restriction for the suction hole 7d in the aspect that it must be formed within the orbiting radius of the orbiting scroll 6.

SUMMARY OF THE INVENTION

Therefore, an object of the present invention is to provide a back pressure structure of a scroll compressor in which a control valve is quickly reacted on an intermediate gas flown into a suction hole when the back pressure control valve is closed or opened, so that the intermediate pressure is constantly formed.

Another object of the present invention is to provide a back pressure structure of a scroll compressor in which a suction hole is freely formed in any place without being restricted by other parts, so that it can be easily made.

To achieve these and other advantages and in accordance with the purposed of the present invention, as embodied and broadly described herein, there is provided a back pressure structure of a scroll compressor having a fixed scroll forming a plurality of compressive chambers together with an orbiting scroll in its casing; including: a suction pressure space having a predetermined volume formed at one side of the fixed scroll; a suction hole formed for guiding a part of an intermediate gas filled in an intermediate pressure space filled in the rear side of the orbiting scroll to the suction pressure space by passing through the fixed scroll; a vent hole formed at the other side of the suction pressure space for guiding the intermediate pressure gas flown into the suction pressure space through the suction hole to the outermost compressive chamber which has a relatively low pressure; and a back pressure control valve elastically supported by an elastic member in the suction pressure space to open and close the suction hole, whose area receiving the intermediate pressure is almost the same whether it is opened or not.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3A and 3B are vertical-sectional view showing a process for a back pressure of an intermediate of the high pressure-type scroll compressor of the conventional art, in which FIG. 3A shows a state of a suction hole that is closed when an orbiting scroll is orbited during the process for the back pressure of the intermediate pressure;

FIG. 3B shows a state of a suction hole that is opened when an orbiting scroll is orbited during the process for the back pressure of the intermediate pressure;

DETAILED DESCRIPTION OF THE PREFERRED EMBODIMENTS

Reference will now be made in detail to the preferred embodiments of the present invention, examples of which are illustrated in the accompanying drawings.

Figure 1:
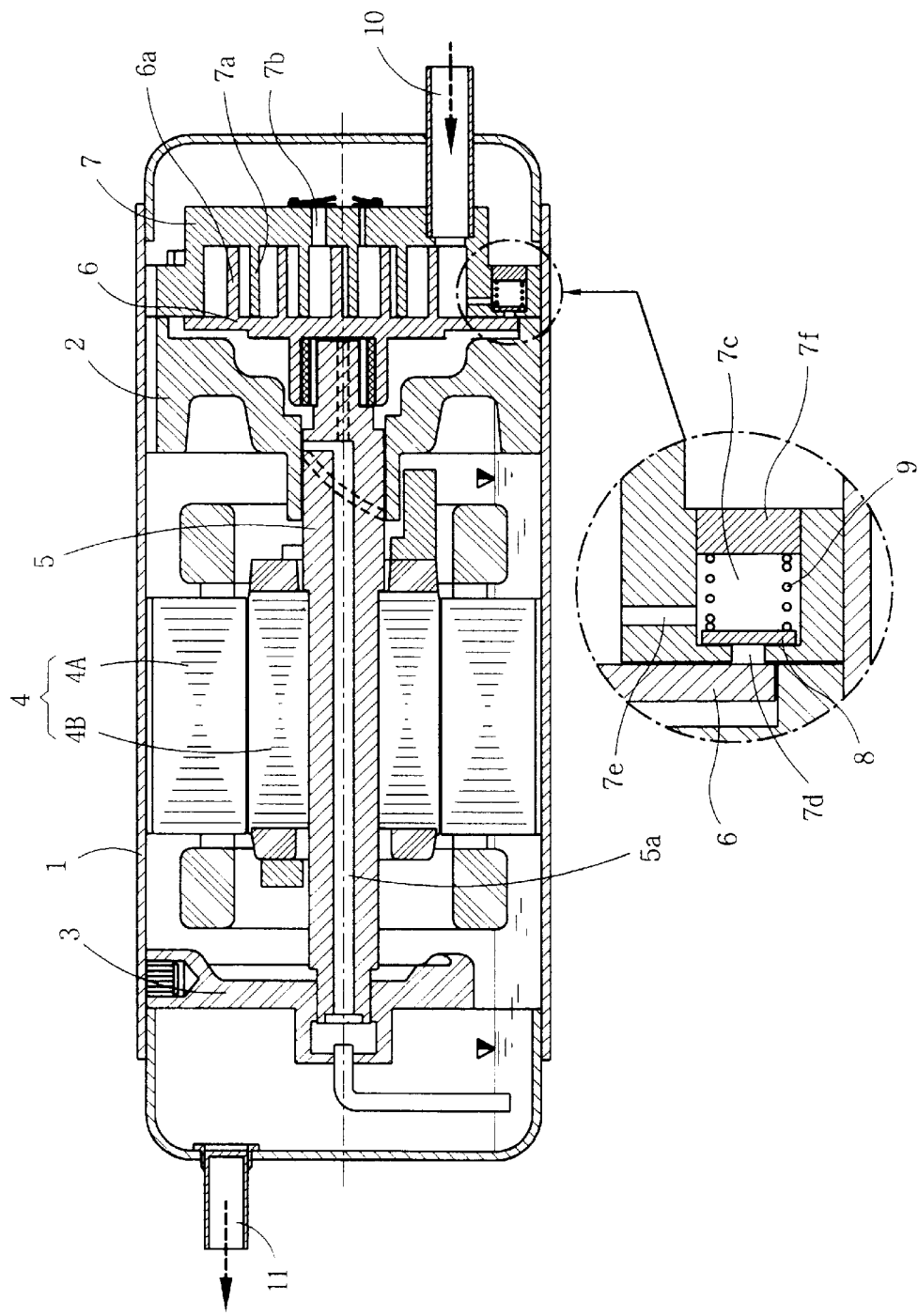
FIG. 1 is a vertical-sectional view of a high pressure-type scroll compressor in accordance with a conventional art.
Figure 2:
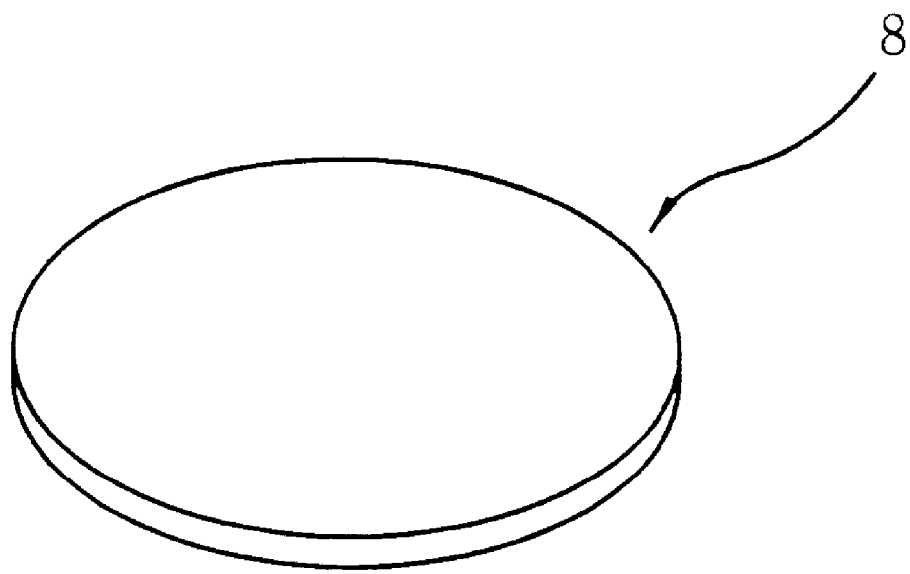
FIG. 2 is a perspective view of a back pressure control valve of the high pressure-type scroll compressor in accordance with the conventional art.
Figure 3A:
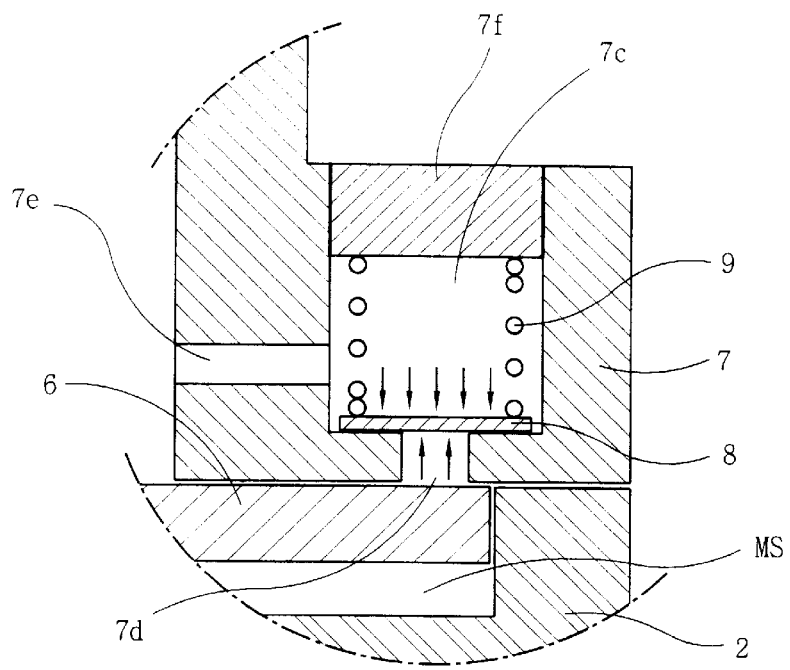
Figure 3B:
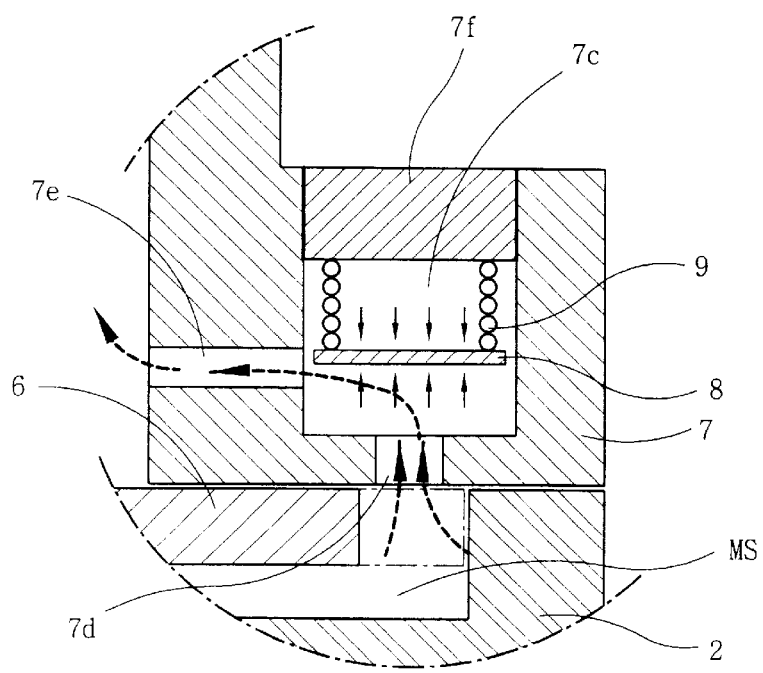
Figure 4:
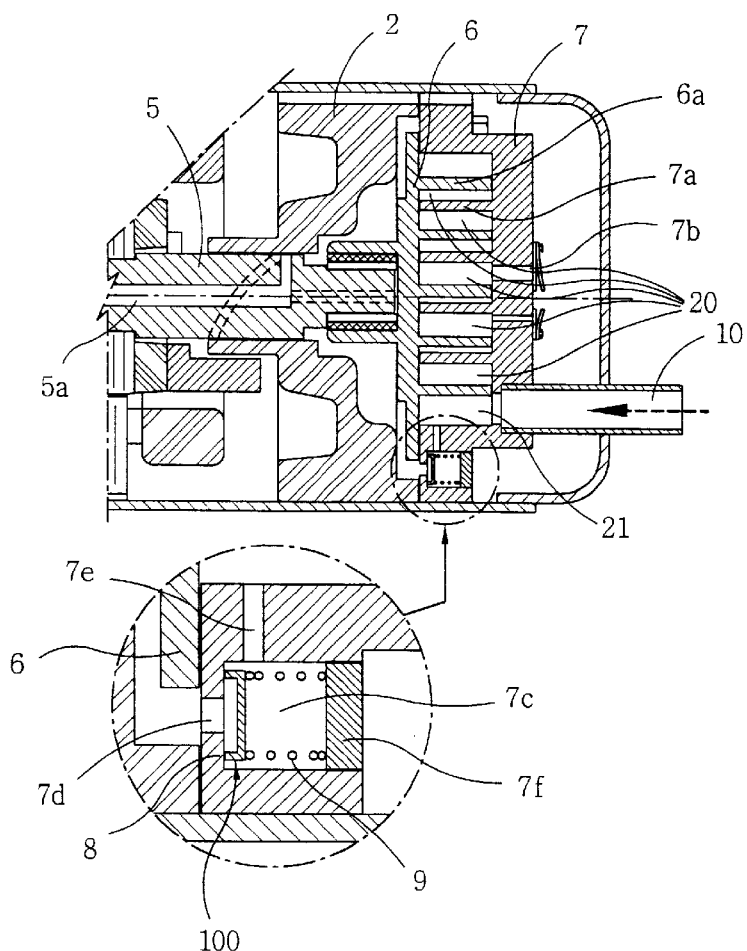
FIG. 4 is a sectional view of a high pressure-type scroll compressor having a back pressure control valve in accordance with the present invention.
Figure 5:
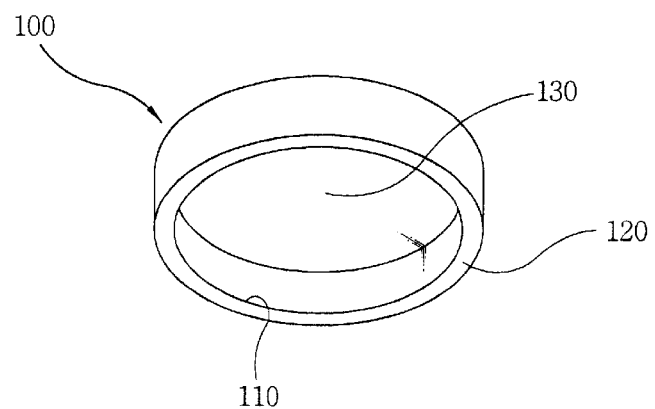
FIG. 5 is a perspective view of the back pressure control valve in accordance with the present invention.
Figure 6A:
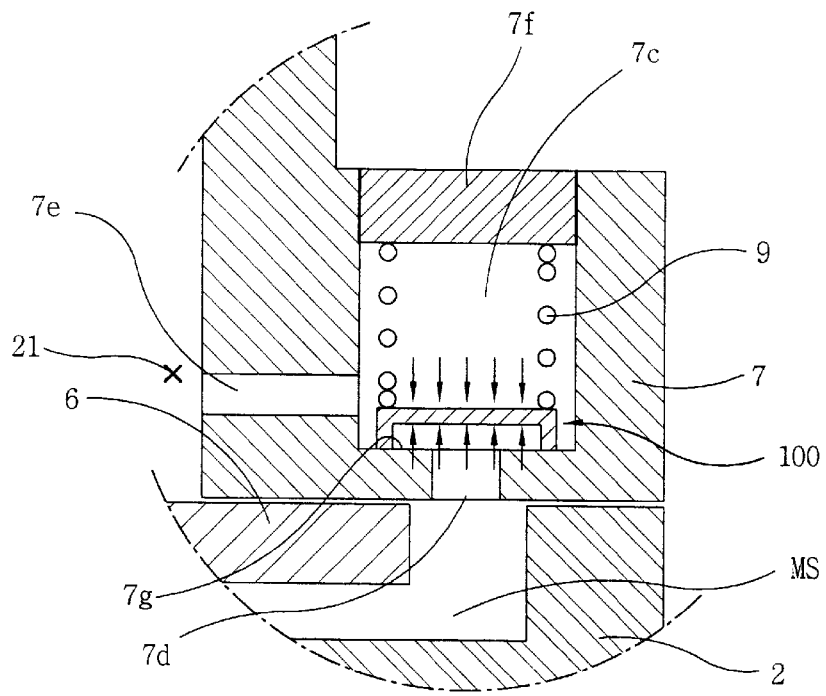
FIGS. 6A and 6B are vertical-sectional views of a pressure for a back pressure of an intermediate pressure in the high pressure-type scroll compressor in accordance with the present invention.
Figure 6B:
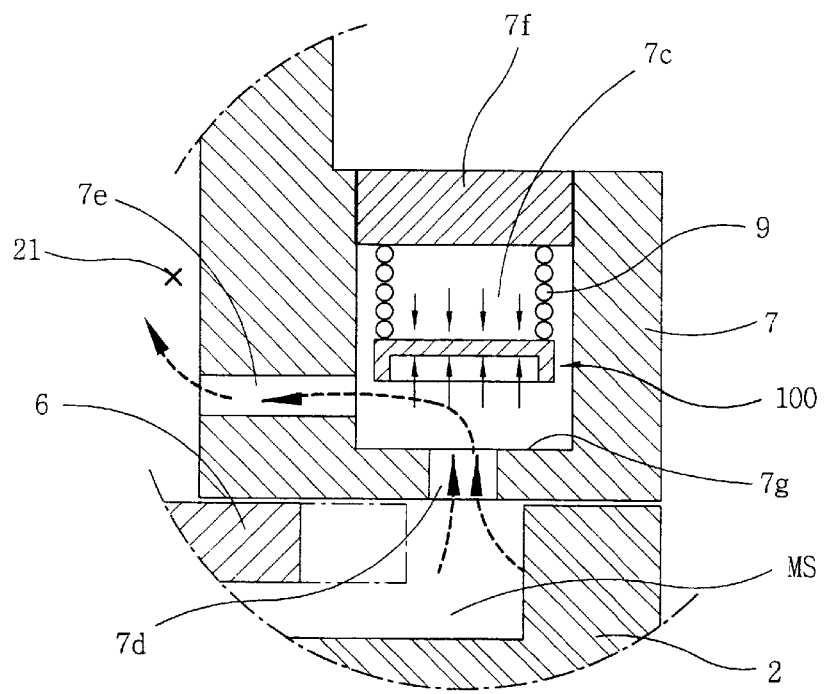

FIG. 4 is a sectional view of a high pressure-type scroll compressor having a back pressure control valve in accordance with the present invention, and FIG. 5 is a perspective view of the back pressure control valve in accordance with the present invention.

As shown in the drawings, the horizontal-type scroll compressor having a back pressure structure according to the present invention is constructed as follows.

A main frame 2 and a sub-frame (not shown) are fixedly installed at right and left sides of a drive motor 4 in a casing 1, and a driving shaft 5 passing through the main frame 2 is press-fitted at a rotor 4B of the drive motor 4.

At the upper end of the driving shaft 5, an orbiting scroll 6 where a wrap 6a is formed in an involute curve is rotatably combined thereto.

A fixed scroll 7 is formed on the upper surface of the orbiting scroll 6, the fixed scroll 7 having wraps 7a formed in an involute curve and engaged with the wraps 6a of the orbiting scroll 6 so as to form a plurality of compressive chambers 20. The fixed scroll 7 is fixedly installed at the margin of the main frame 2.

A suction pipe 10 passing through the casing 1 is installed to be directly communicated with the outermost compressive chamber 21 that is formed between the two scrolls 6 and 7.

At the center of the fixed scroll 7, there is formed a discharge hole 7b communicated with the last compressive chamber for discharging a compressed gas toward inside of the casing 1.

At the rear side of the orbiting scroll 6, there is provided a back pressure control unit for revolving a part of the intermediate pressure gas of the intermediate pressure space MS between the orbiting scroll 6 and the main frame 2 toward the outermost compressive chamber 21.

The back pressure control unit includes a suction pressure space 7c formed having a predetermined volume at the margin of the fixed scroll 7; a suction hole 7d formed at the side of a plane of the fixed scroll 7 of the suction pressure space 7c, for communicating the intermediate pressure space MS and the suction pressure space 7c; a vent hole 7e formed at one side of the suction pressure space 7c, for communicating the suction pressure space 7c and the outermost compressive chamber 21; a back pressure control valve 100 positioned at the suction pressure space 7c to open and close the suction hole 7d, and being elastically supported by a coil spring 9.

As to the suction hole 7d, its entrance may be formed within the orbiting radius of the orbiting scroll 6, or may be formed in outer side of orbiting radius of the orbiting scroll 6.

The back pressure control valve 100 is formed in a cylinder type of which one side is covered so as to receive the same pressure regardless of its opening or closing state, and its opening 110 is positioned to be directed toward the suction hole 7d.

Though not shown in the drawing, the back pressure control valve may be formed in a dome type.

Reference numeral 120 denotes an edge part of the back pressure control valve 100.

The operation of the scroll compressor having the back pressure structure constructed as described above according to the present invention will now be explained.

When a power is supplied, the driving shaft 5 is rotated along with the rotor 4B by the power, according to which the orbiting scroll 6 is orbited at a distance as long as the eccentric distance. Then, a plurality of compressive chambers 20 are formed between the two wraps 6a and 7a of the orbiting scroll 6 and the fixed scroll 7, by which a coolant gas is sucked and compressed and discharged to the discharge port 7b of the fixed scroll 7.

A part of the highly pressurized discharge gas flows to the intermediate pressure space MS, and thus, when the pressure of the intermediate pressure space MS is increased beyond a constant pressure, a part of the intermediate gas thrust the back pressure control valve 100 and then flown into the opened suction pressure space 7c through the suction hole 7d.

The intermediate pressure gas flown into the suction hole 7c is flown out to the outermost compressive chamber 21 (or the suction chamber) through the vent hole 7e, so that the intermediate pressure space MS is maintained at a constant pressure.

In this respect, since the pressurized area of the back pressure control valve 100 when it is opened and closed are almost the same due to the covering top 130 and the edge part 120 of back pressure control valve 100, its pressurization distribution of the intermediate pressure gas applied to the covering top 130 is constant regardless of whether the back pressure control valve 100 is opened or closed, resulting in that the reaction speed of the back pressure control valve 100 is improved and the intermediate pressure of the intermediate pressure space MS is constantly maintained, so that the movement of the orbiting scroll is stably maintained.

Thereafter, when the pressure of the intermediate pressure space MS drops to a predetermined level, the back pressure control valve 100 is lowered down by means of the coil spring 9, thereby blocking the suction hole 7d.

As mentioned above, in case that the diameter of the suction pressure space 7c is relatively greater than that of the suction hole 7d, when the edge part 120 of the back pressure control valve 100 that is inserted in the suction pressure space 7c and opens and closes the suction hole 7d is formed to be contacted to one side of the suction pressure space 7c, the pressurization distribution formed at the bottom surface 7g of the back pressure control valve 100 becomes constant, so that the reactivity is improved regardless of opening or closing of the valve 100, according to which the pressure of the intermediate pressure space MS is constantly maintained, and thus, the orbiting scroll 6 is stably moved, improving the performance of the compressor.

In addition, since the pressurized area is the same regardless of whether the back pressure control valve 100 is closed or opened, the suction hole 7d may be formed at any position regardless of the orbiting radius of the orbiting scroll, which facilitates its fabrication.

As so far described, according to the back pressure structure of the scroll compressor of the present invention, the pressurized area of the back pressure control valve by the intermediate pressure gas through the suction hole is constantly the same, to thereby improve the speed of the reaction, by which the intermediate pressure space between the main frame and the orbiting scroll is maintained to be in a constant state, thereby preventing an abnormal movement of the orbiting scroll, and thus, leakage of the pressure gas can be prevented. And, since the position of the suction hole can be freely selected in its fabrication without being restricted in relation to other parts, so that its fabrication is easy.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A back pressure structure of a scroll compressor having a fixed scroll forming a plurality of compressive chambers together with an orbiting scroll in its casing, comprising:

a suction pressure space having a predetermined volume formed at one side of the fixed scroll;

a suction hole formed for guiding a part of an intermediate gas filled in an intermediate pressure space filled in the rear side of the orbiting scroll to the suction pressure space by passing through the fixed scroll;

a vent hole formed at the other side of the suction pressure space for guiding the intermediate pressure gas flown into the suction pressure space through the suction hole to the outermost compressive chamber which has a relatively low pressure; and a back pressure control valve elastically supported by an elastic member in the suction pressure space to open and close the suction hole, said control valve having a top covering and an edge connected to said top covering, said edge extending around the suction hole when the valve is in the closed position such that the area of the top covering to which pressure is imparted is the same whether the valve is opened or closed.

2. The back pressure structure according to claim 1, wherein the back pressure control valve is formed in a cylinder type, one end of which is covered, and installed in a manner that its opening is directed to the plane where the suction hole is formed.

3. The back pressure structure according to claim 1, wherein the back pressure control valve is formed in a dome shape and installed in a manner that its opening is directed to the plane where the suction hole is formed.

4. The back pressure structure according to claim 1, wherein an entrance of the suction hole is formed within the orbiting radius of the orbiting scroll.

5. The back pressure structure according to claim 1, wherein an entrance of the suction hole is formed outside the orbiting radius of the orbiting scroll.

6. In a back pressure structure of a high pressure scroll compressor in which an orbiting scroll is mounted on a main frame fixed in its casing, a fixed scroll forming a plurality of compressive chambers together with the orbiting scroll is fixed in the main frame, a suction pipe passing through the casing passes through the fixed scroll to directly communicate with the outermost compressive chamber, and a discharge port passing through the central part of the fixed scroll so as to be communicated with the last compressive chamber, by which a high pressure discharge gas is filled in the casing;

a suction pressure space having a predetermined volume is formed at one side of the fixed scroll, a suction hole is formed passing through the fixed scroll from the bottom surface of the suction pressure space so as to guide a part of the intermediate pressure gas filled between the main frame and the orbiting scroll to the suction pressure space, a vent hole communicated with the outermost compressive chamber at the side of the suction pressure space through the suction hole to the outermost compressive chamber that has a relatively low pressure, wherein a back pressure control valve is elastically supported by an elastic member in the suction pressure space to open and close the suction hole, said control valve having a top covering and an edge connected to said top covering, said edge extending around the suction hole when the valve is in the closed position such that the area of the top covering to which pressure is imparted is the same whether the valve is opened or closed.

7. A back pressure structure of a scroll compressor having a fixed scroll forming a plurality of compressive chambers together with an orbiting scroll in its casing, the back pressure structure comprising:

a suction pressure space having a predetermined volume formed at one side of the fixed scroll;

a suction hole formed at one side of the suction pressure space and configured to guide the a portion of a gas filled in a pressure space at a rear side of the orbiting scroll to the suction pressure space by passing the gas through the fixed scroll;

a vent hole formed at another side of the suction pressure space and configured to guide the gas flown into the suction pressure space through the suction hole to an outermost compressive chamber; and a back pressure control valve elastically supported by an elastic member in the suction pressure space to open and close the suction hole, said control valve having a top covering and an edge connected to said top covering, said edge extending around the suction hole when the valve is in the closed position such that the area of the top covering to which pressure is imparted is the same whether the valve is opened or closed.

8. The back pressure structure according to claim 7, wherein the back pressure control valve is formed as a cylinder, one end of which is covered, and installed in a manner that its open end faces the suction hole.

9. The back pressure structure according to claim 7, wherein the back pressure control valve is formed in a dome shape and installed in a manner that its open end faces the suction hole.

10. The back pressure structure according to claim 7, wherein an entrance of the suction hole is formed within an orbiting radius of the orbiting scroll.

11. The back pressure structure according to claim 7, wherein an entrance of the suction hole is formed outside an orbiting radius of the orbiting scroll.

12. The scroll compressor according to claim 7, wherein the outermost compressive chamber has a relatively low pressure.

13. A scroll compressor, comprising:

a casing;

an orbiting scroll;

a fixed scroll forming a plurality of compressive chambers together with the orbiting scroll within the casing; and a back pressure structure, comprising:

a suction pressure space having a predetermined volume formed at one side of the fixed scroll;

a suction hole formed at one side of the suction pressure space and configured to guide a portion of a gas filled in a pressure space at a rear side of the orbiting scroll to the suction pressure space by passing the gas through the fixed scroll;

a vent hole formed at another side of the suction pressure space and configured to guide the gas flown into the suction the suction pressure space through the suction hole of an outermost compressive chamber; and a back pressure control valve elastically supported by an elastic member in the suction pressure space to open and close the suction hole, said control valve having a top covering and an edge connected to said top covering, said edge extending around the suction hole when the valve is in the closed position such that the area of the top covering to which pressure is imparted is the same whether the valve is opened or closed.

14. The scroll compressor according to claim 13, wherein the back pressure control valve is formed as a cylinder, one end of which is covered, and installed in a manner that its open end faces the suction hole.

15. The scroll compressor according to claim 13, wherein the back pressure control valve is formed in a dome shape and installed in a manner that its open end faces the suction hole.

16. The scroll compressor according to claim 13, wherein an entrance of the suction hole is formed within an orbiting radius of the orbiting scroll.

17. The scroll compressor according to claim 13, wherein an entrance of The suction hole is formed outside an orbiting radius of the orbiting scroll.

18. The scroll compressor according to claim 13, further comprising:

a main frame and a subframe fixed at both sides of the casing, wherein a drive motor having a stator and a rotor are mounted between the main frame and the subframe; and a driving shaft configured to pass through the remain frame and a center of the rotor.

19. The scroll compressor according to claim 18, wherein the orbiting scroll is rotatably installed on the driving shaft.

20. The scroll compressor according to claim 19, further comprising:

a suction pipe configure to receive a refrigerant gas therethrough into the casing; and a discharge pipe configured to discharge gas out of the casing.

* * * * *